J. J. MILLER.
MACHINE FOR MAKING BOX BLANKS.
APPLICATION FILED JULY 5, 1912.
1,295,187.
Patented Feb. 25, 1919.
4 SHEETS—SHEET 4.
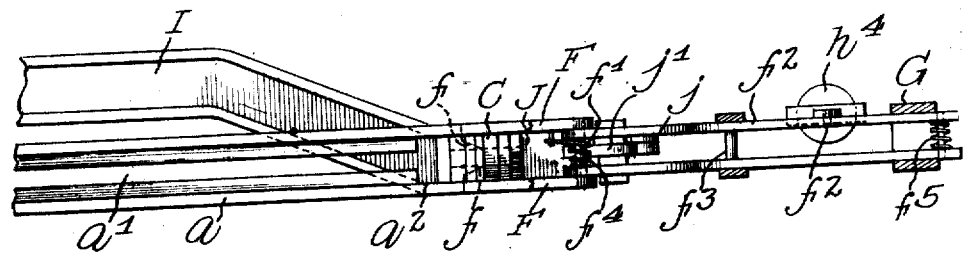
Fig. 6.
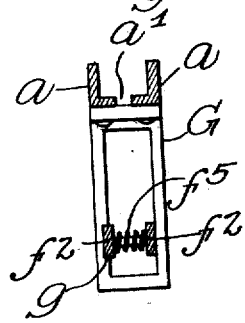
Fig. 7.
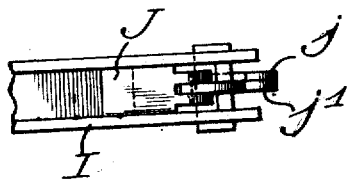
Fig. 8.
Fig. 9.
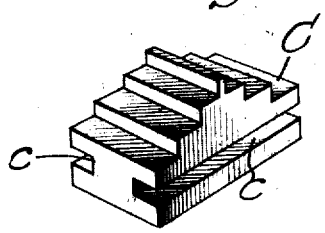
Fig. 10.
Fig. 11.
Witnesses:
G. W. Omarus Jr.
R. Bauerle
Inventor.
Julius J. Miller
By Arthur F. Durand
Attorney

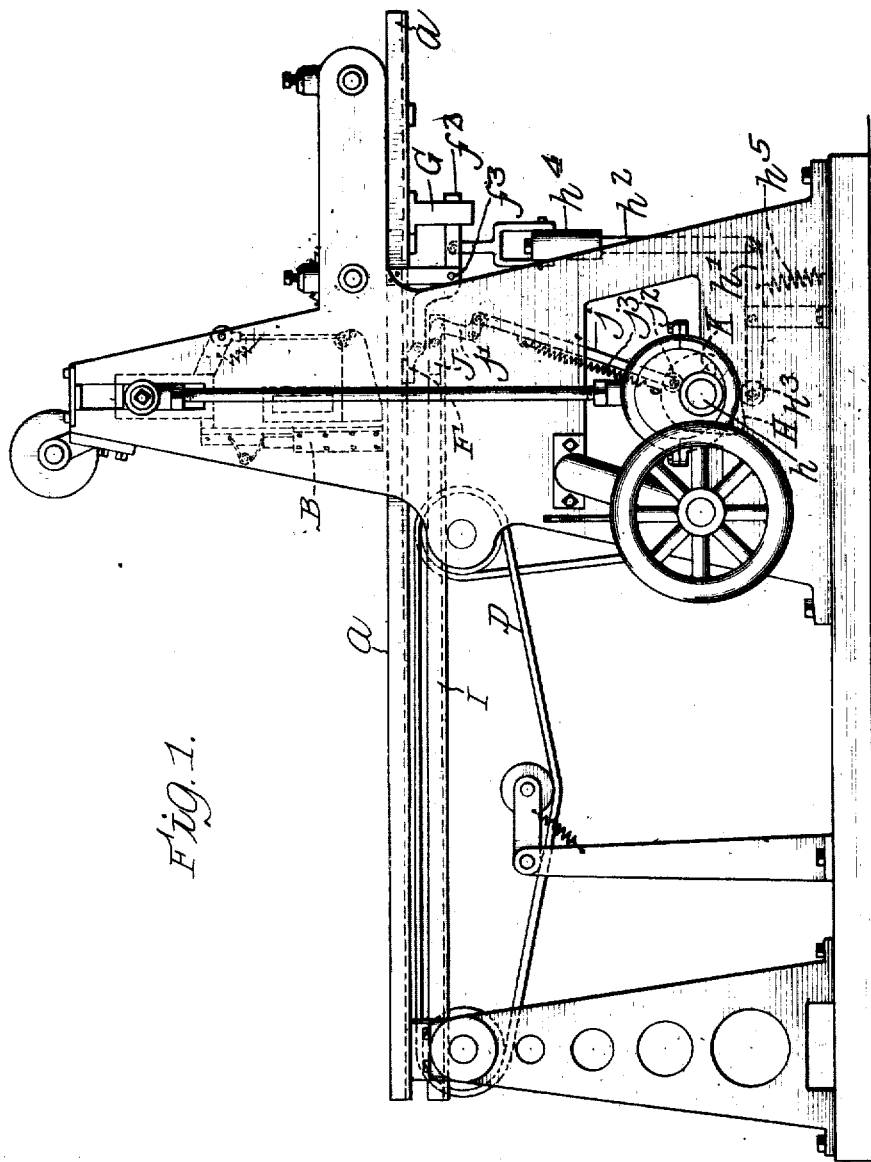

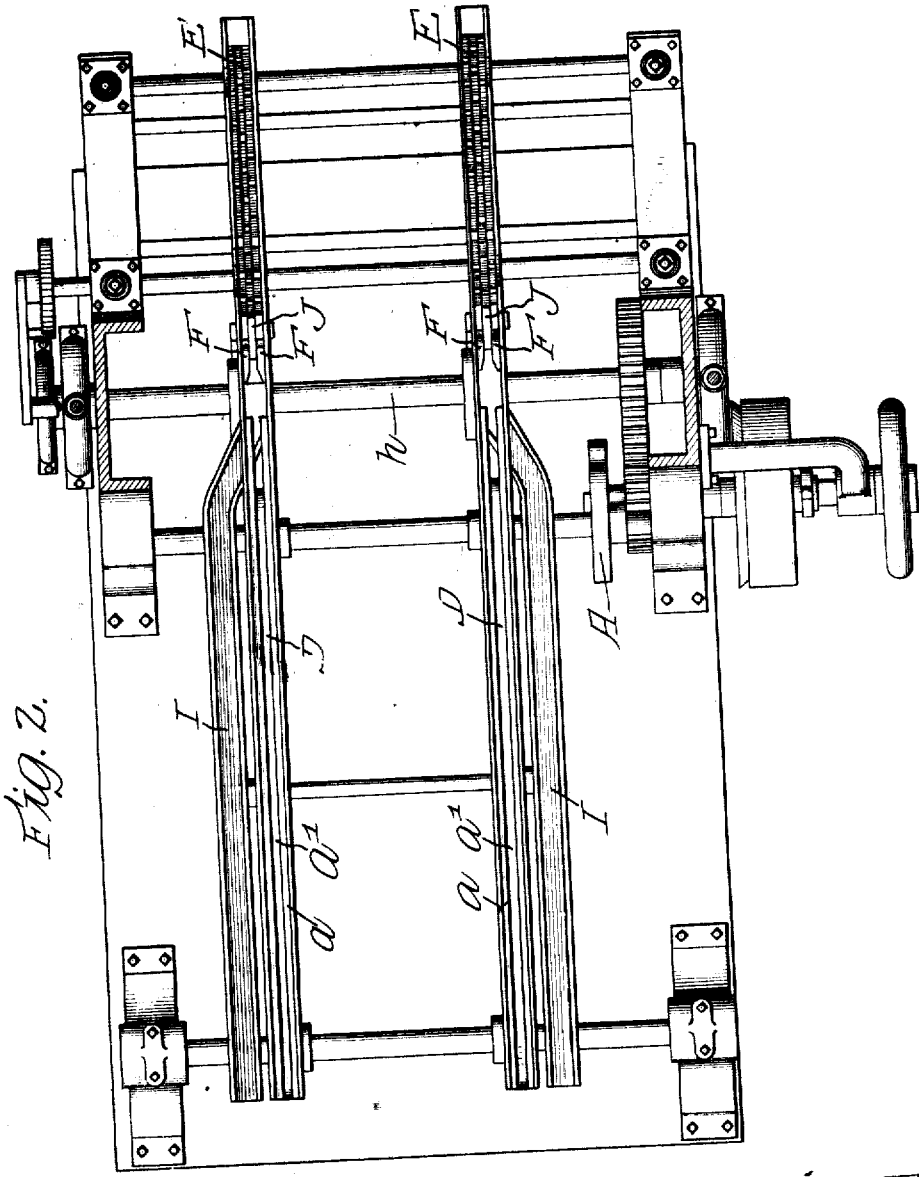

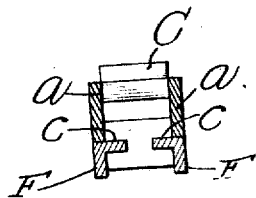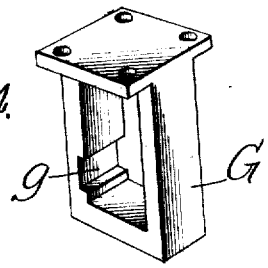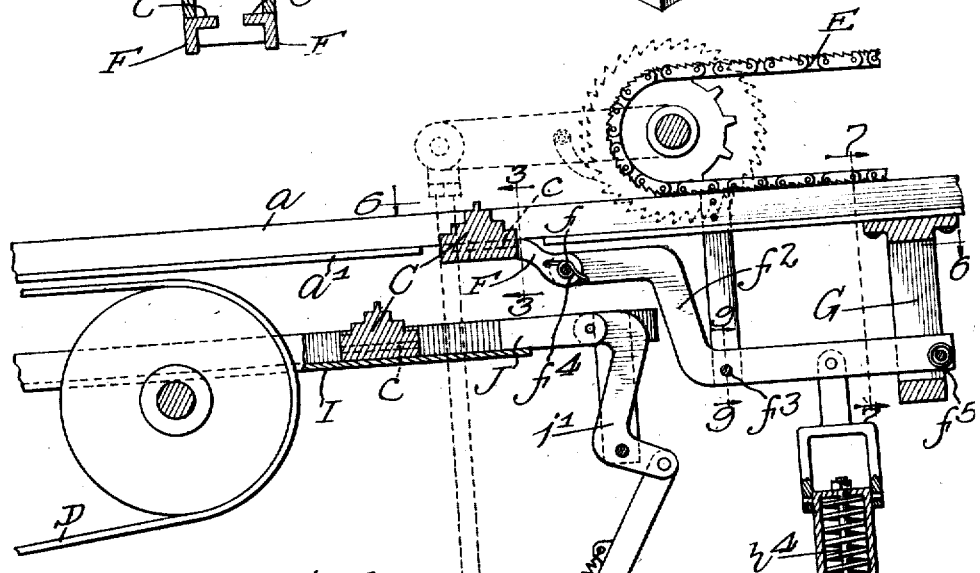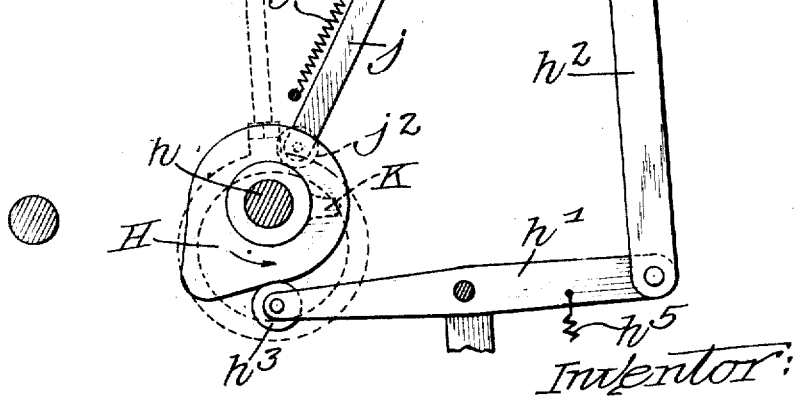

UNITED STATES PATENT OFFICE.

JULIUS J. MILLER, OF ST. JOSEPH, MICHIGAN, ASSIGNOR, BY MESNE ASSIGNMENTS, TO WIREBOUNDS PATENTS COMPANY, OF KITTERY, MAINE, A CORPORATION OF MAINE.

MACHINE FOR MAKING BOX-BLANKS.

1,295,187.   Specification of Letters Patent.   Patented Feb. 25, 1919.

Application filed July 5, 1912. Serial No. 707,767.

*To all whom it may concern:*

Be it known that I, JULIUS J. MILLER, a citizen of the United States of America, and resident of St. Joseph, Berrien county, Michigan, have invented a certain new and useful Improvement in Machines for Making Box-Blanks, of which the following is a specification.

My invention relates to machines for making box blanks of that kind in which the different sections thereof are reinforced by cleats and flexibly connected together by wires extending longitudinally upon the outer surface of the blank.

More specifically considered, my invention relates to machines of that kind in which loose blocks are employed for spacing the cleats apart endwise.

The object of my invention is to provide means for automatically and forcibly extracting the loose spacing blocks from between the ends of the cleats after the latter are wired together.

Another object is to provide means for returning the blocks in a step by step manner, after they are extracted from the blank materials, whereby for each block extracted, another block is brought within reach of the operator or attendant who places the cleats and blocks in the machine.

It is also an object to provide certain details and features of construction tending to increase the general efficiency of a box blank machine of this particular character.

To these and other useful ends my invention consists in matters hereinafter set forth and claimed.

In the accompanying drawings—

Figure 1 is a side elevation of a box blank machine embodying the principles of my invention.

Fig. 2 is a plan of the said machine.

Fig. 3 is an enlarged detail section on line 3—3 in Fig. 5.

Fig. 4 is a perspective of the bracket or yoke that controls a part of the extracting mechanism.

Fig. 5 is an enlarged detail sectional view showing the extracting mechanism.

Fig. 6 is a section on line 6—6 in Fig. 5.

Fig. 7 is a detail section on line 7—7 in Fig. 5.

Fig. 8 is a detail view of a portion of the extracting mechanism.

Fig. 9 is an enlarged detail section on line 9—9 in Fig. 5.

Fig. 10 is a perspective of one of the spacing blocks.

Fig. 11 is a perspective of one of the grippers of the block extracting mechanism.

As thus illustrated, my invention comprises a frame A having parallel and longitudinally extending cleat guides $a$, and provided with staplers B of any suitable character, arranged over the path of travel of the blank materials. The guides $a$ are like channel irons with a slot $a^1$ in the bottom of each channel, and at $a^2$ the bottom of each guide is entirely cut away for a short distance to form an opening through which the spacing blocks C may be extracted downward. The spacing blocks C might be called discrete elements since each, in itself, is an entirely independent, self-contained element not connected in any way with the other parts of the machine, and which is inserted in and removed from the guideways of the conveyer during the operation of the machine. These blocks, it will be seen, are provided with lateral grooves $c$ that engage the bottom flanges of the guides, whereby the said blocks are held against displacement from the guides while approaching the openings $a^2$ in the bottom of the guides.

The feed mechanism for feeding the blank materials along the guides comprises the fast running belts D that engage the lower ends of the blocks C and by friction force the cleats and blocks and veneer along to the staples. The step by step motion necessary for the blank materials is produced by the ratchet operated feed chains E which engage the top of the blanks. The staples are driven while the materials are at rest, and then the actuation of the chains E causes the materials on the machine to advance one step. It will be understood that the feed devices D and E can be operated by any suitable means.

The mechanism for extracting the blocks 1

C from the blank materials comprises a pair of grippers F for each side of the machine—that is to say, for each guide. These grippers have flanges $f$ that engage the grooves $c$ on the blocks C, and are pivoted at $f^1$ upon the levers $f^2$, which latter are loosely pivoted at $f^3$ upon the machine. Springs $f^4$ are used at the pivots $f^1$ to yieldingly hold the grippers F in the position shown in Fig. 5. A spring connection $f^5$ is employed for forcing apart the rear ends of the levers $f^2$. A bracket or yoke G is fixed on the machine in position to embrace the rear ends of the levers $f^2$ and provided with a notch $g$ which permits the two levers to spring apart at their rear ends when in the position shown in Fig. 5. This locks the grippers in position to receive the advancing spacing block C, as shown, and the forcing of the spacing block between the grippers forces the rear ends of the levers $f^2$ together, thus releasing them from the notch $g$. The grippers with the spacing blocks therein are then caused to move downward by the cam H on the shaft F, through the medium of the lever $h^1$, and the pitman $h^2$, the said lever having a roll $h^3$ engaged by said cam to move the pitman $h^2$ upward at the proper time. The spring connection $h^4$ in the pitman $h^2$ permits the lever $h^1$ to vibrate idly while the levers $f^2$ are locked by the engagement of one of the latter with the notch $g$. When the levers $f^2$ are unlocked, then the pitman $h^2$ moves the rear ends of the levers $f^2$ upward, and thereby moves the grippers F downward. When thus moved downward the said grippers deposit the blocks C upon the guide I, and at this time the pivot $f^1$ comes into play to enable the block to rest squarely upon the bottom of said guide. The pusher J moves back and forth on the said guide, and is operated by a cam K on the shaft $h$, through the medium of the pitman $j$ and the lever $j^1$, the said pitman having a roll $j^2$ that engages said cam. After the block C comes to rest on the guide I, the pusher J then moves forward and expels the block from between the two grippers. At the same time this pushes the entire row of blocks forward—that is to say, there is always a solid row of blocks in the guide I, and each addition of one moves the entire row one step in the direction necessary to bring the one at the other end within reach of the operator or attendant. Thus the blocks are automatically extracted from between the ends of the cleats, after the latter are wired together, and the extracted blocks are returned step by step to the operator's position. The lever $h^1$ is retracted by a spring $h^5$, and the pitman J is retracted by the spring $j^3$. The extracting mechanism remains practically inert or dormant until a block C is forced into the grippers. Then the operation just described takes place automatically.

With a machine of the foregoing character, the loose spacing blocks can not remain in the blank, because each block is forcibly extracted before the blank leaves the machine.

What I claim as my invention is:—

1. A wire bound box blank machine comprising feed mechanism for advancing the blank materials step by step in one direction, spacing blocks for insertion at will between the ends of the cleats and movable along with the advancing blank materials, said blocks being spaced apart by the incoming cleats, mechanism for automatically engaging the blocks in succession to extract them from the said materials, causing each block to become inoperative until again inserted by manual effort, and means for wiring the said materials together.

2. A wire bound box blank machine comprising feed mechanism for advancing the blank materials step by step in one direction, spacing blocks for insertion between the ends of the cleats and movable along with the advancing blank materials, mechanism for automatically engaging the blocks in succession to extract them from the said materials, and means for wiring the said materials together, said mechanism including means for releasing the blocks after the extraction thereof.

3. A wire bound box blank machine comprising feed mechanism for advancing the blank materials step by step in one direction, spacing blocks for insertion between the ends of the cleats and movable along with the advancing blank materials, mechanism for automatically engaging the blocks in succession to extract them from the said materials, and means for wiring the said materials together, said mechanism including a cam controlled gripping device for pulling the block downward at a given point in the path of travel thereof.

4. A wire bound box blank machine comprising feed mechanism for advancing the blank materials step by step in one direction, spacing blocks for insertion at will between the ends of the cleats and movable along with the advancing blank materials, said blocks being spaced apart by the incoming cleats, mechanism for automatically engaging the blocks in succession to extract them from the said materials, causing each block to become inoperative until again inserted by manual effort, means for wiring the said materials together, and means for receiving and returning the extracted blocks in the opposite direction.

5. A wire bound box blank machine comprising feed mechanism for advancing the blank materials step by step in one direction, spacing blocks for insertion between the ends of the cleats and movable along with the advancing blank materials, mechanism for automatically engaging the blocks in succession to extract them from the said materials, means for wiring the said materials together, said mechanism including means for releasing the blocks after the extraction thereof, and means for receiving and returning the extracted blocks in the opposite direction.

6. A wire bound box blank machine comprising feed mechanism for advancing the blank materials step by step in one direction, spacing blocks for insertion between the ends of the cleats and movable along with the advancing blank materials, mechanism for automatically engaging the blocks in succession to extract them from the said materials, means for wiring the said materials together, said mechanism including a cam controlled gripping device for pulling the block downward at a given point in the path of travel thereof, and means for receiving and returning the extracted blocks in the opposite direction.

7. A wire bound box blank machine comprising feed mechanism for advancing the blank materials step by step in one direction, spacing blocks for insertion between the ends of the cleats and movable along with the advancing blank materials, mechanism for automatically engaging the blocks in succession to extract them from the said materials, means for wiring the said materials together, means for maintaining the extracted blocks together in a row, and means for pushing the row forward each time a block is added thereto.

8. A wire bound box blank machine comprising feed mechanism for advancing the blank materials step by step in one direction, spacing blocks for insertion between the ends of the cleats and movable along with the advancing blank materials, mechanism for automatically engaging the blocks in succession to extract them from the said materials, means for wiring the said materials together, said mechanism including means for releasing the blocks after the extraction thereof, means for maintaining the extracted blocks together in a row, and means for pushing the row forward each time a block is added thereto.

9. A wire bound box blank machine comprising feed mechanism for advancing the blank materials step by step in one direction, spacing blocks for insertion between the ends of the cleats and movable along with the advancing blank materials, mechanism for automatically engaging the blocks in succession to extract them from the said materials, means for wiring the said materials together, said mechanism including a cam controlled gripping device for pulling the block downward at a given point in the path of travel thereof, means for maintaining the extracted blocks together in a row, and means for pushing the row forward each time a block is added thereto.

10. A wire bound box blank machine comprising feed mechanism for advancing the blank materials step by step in one direction, spacing blocks for insertion between the ends of the cleats and movable along with the advancing blank materials, mechanism for automatically engaging the blocks in succession to extract them from the said materials, means for wiring the said materials together, guides for the cleats and blocks, and means on the blocks for engaging said guides to prevent upward displacement of the blocks, said guides having openings for delivering the blocks to said mechanism.

11. A wire bound box blank machine comprising feed mechanism for advancing the blank materials step by step in one direction, spacing blocks for insertion between the ends of the cleats and movable along with the advancing blank materials, mechanism for automatically engaging the blocks in succession to extract them from the said materials, means for wiring the said materials together, said mechanism including means for releasing the blocks after the extraction thereof, guides for the cleats and blocks, and means on the blocks for engaging said guides to prevent upward displacement of the blocks, said guides having openings for delivering the blocks to said mechanism.

12. A wire bound box blank machine comprising feed mechanism for advancing the blank materials step by step in one direction, spacing blocks for insertion between the ends of the cleats and movable along with the advancing blank materials, mechanism for automatically engaging the blocks in succession to extract them from the said materials, means for wiring the said materials together, said mechanism including a cam controlled gripping device for pulling the block downward at a given point in the path of travel thereof, guides for the cleats and blocks, and means on the blocks for engaging said guides to prevent upward displacement of the blocks, said guides having openings for delivering the blocks to said mechanism.

13. A box blank machine comprising spacing blocks for insertion between the ends of the cleats, means for wiring the sections of the blank together, and means disposed in position to receive the on-coming blocks operating automatically to cause the forcible displacement of said blocks from the blanks.

14. A box blank machine comprising spacing blocks for insertion between the ends of the cleats, means for wiring the sections of the blank together, and means disposed in position to receive the on-coming blocks operating automatically to cause the forcible displacement of said blocks from the blanks together with means to cause the said blocks to be automatically returned to the operator's position, said latter means operating in cycle with the means for causing the displacement of the blocks.

15. A box blank machine comprising spacing blocks for manual insertion between the ends of the cleats, means for wiring the sections of the blank together, and automatic means for causing the displacement of said blocks from the blanks, operating to pull the blocks downward from between the cleats.

16. A box blank machine comprising spacing blocks for separating the cleats, and automatic means for causing the blocks to be withdrawn in a downward direction from between the cleats, said means being disposed in position to receive the approaching blocks.

17. A box blank machine comprising spacing blocks for separating the cleats, and automatic means for causing the blocks to be withdrawn in a downward direction from between the cleats, said means being disposed in position to receive the approaching blocks, said blocks forming a spacing means which is operative without adjustment in conjunction with cleats of different lengths.

18. A box blank machine comprising spacing blocks for separating the cleats, automatic means for causing the blocks to be withdrawn in a downward direction from between the cleats, said means being disposed in position to receive the approaching blocks, and means having teeth which impinge upon the longitudinal surfaces of the blanks for engaging the blanks to feed the same forward.

19. A machine for making box blanks by successively wiring together the side material and cleats forming the previously unconnected side parts of each blank, to produce a flexible blank as the immediate result of said wiring operation, comprising staplers for applying the binding wires, spacing blocks for insertion between the ends of the cleats, feeding means for advancing said blocks and materials relatively to said staplers, extractor mechanism toward which the blocks are advanced by said feeding means, and means for operating said mechanism to forcibly disengage the blocks from the blanks.

20. A machine for making box blanks by successively wiring together the side material and cleats forming the previously unconnected side parts of each blank, to produce a flexible blank as the immediate result of said wiring operation, comprising staplers for applying the binding wires, spacing blocks for insertion between the ends of the cleats, feeding means for advancing said blocks and materials relatively to said staplers, extractor mechanism toward which the blocks are advanced by said feeding means, and means for operating said mechanism to forcibly disengage the blocks from the blanks, parallel guides for said blocks and cleats, said guides being constructed to release said blocks, and said mechanism including means arranged below each guide to engage the approaching blocks.

21. A machine for making box blanks by successively wiring together the side material and cleats forming the previously unconnected side parts of each blank, to produce a flexible blank as the immediate result of said wiring operation, comprising staplers for applying the binding wires, spacing blocks for insertion between the ends of the cleats, feeding means for advancing said blocks and materials relatively to said staplers, extractor mechanism toward which the blocks are advanced by said feeding means, and means for operating said mechanism to forcibly disengage the blocks from the blanks, said mechanism including elements for engaging and disengaging the blocks.

22. A machine for making box blanks by successively wiring together the side material and cleats forming the previously unconnected side parts of each blank, to produce a flexible blank as the immediate result of said wiring operation, comprising staplers for applying the binding wires, spacing blocks for insertion between the ends of the cleats, feeding means for advancing said blocks and materials relatively to said staplers, extractor mechanism toward which the blocks are advanced by said feeding means, and means for operating said mechanism to forcibly disengage the blocks from the blanks, said mechanism including forks arranged to receive the blocks, and said machine having means for removing the blocks from said forks.

23. A machine for making box blanks by successively wiring together the side material and cleats forming the previously unconnected side parts of each blank, to produce a flexible blank as the immediate result of said wiring operation, comprising staplers for applying the binding wires, spacing blocks for insertion between the ends of the cleats, feeding means for advancing said blocks and materials relatively to said staplers, extractor mechanism toward which the blocks are advanced by said feeding means, and means for operating said mechanism to forcibly disengage the blocks from the blanks, said machine having means for returning the blocks crowded tightly together to the position where wanted for insertion between the cleats.

24. A machine for making box blanks by successively wiring together the side material and cleats forming the previously unconnected side parts of each blank, to produce a flexible blank as the immediate result of said wiring operation, comprising staplers for applying the binding wires, spacing blocks for insertion between the ends of the cleats, feeding means for advancing said blocks and materials relatively to said staplers, extractor mechanism toward which the blocks are advanced by said feeding means, means for operating said mechanism to forcibly disengage the blocks from the blanks, said mechanism including elements for receiving the blocks, and means for moving said elements into and out of the path of said blocks.

25. A machine for making box blanks by successively wiring together the side material and cleats forming the previously unconnected side parts of each blank, to produce a flexible blank as the immediate result of said wiring operation, comprising staplers for applying the binding wires, spacing blocks for insertion between the ends of the cleats, guides for said blocks and cleats, said guides and blocks being relatively formed to prevent upward displacement of the blocks from the guides, and feeding means for causing said blocks and cleats to move along said guides.

26. A machine for making box blanks by successively wiring together the side material and cleats forming the previously unconnected side parts of each blank, to produce a flexible blank as the immediate result of said wiring operation, comprising staplers for applying the binding wires, spacing blocks for insertion between the ends of the cleats, guides for said blocks and cleats, said guides and blocks being relatively formed to prevent upward displacement of the blocks from the guides, and feeding means for causing said blocks and cleats to slide along said guides, said relative formation including coöperating ribs and grooves on the guides and blocks.

27. A machine for making box blanks by successively wiring together the side material and cleats forming the previously unconnected side parts of each blank, to produce a flexible blank as the immediate result of said wiring operation, comprising staplers for applying the binding wires, spacing blocks for insertion between the ends of the cleats, guides for said blocks and cleats, said guides and blocks being relatively formed to prevent upward displacement of the blocks from the guides, and feeding means for causing said blocks and cleats to slide along said guides, said relative formation including grooves in the sides of the blocks, and said machine comprising automatic extractors having means for engaging said grooves to remove the blocks from said guides after the cleats spaced apart thereby are wired together.

28. A machine for making box blanks by successively wiring together the side material and cleats forming the previously unconnected side parts of each blank, to produce a flexible blank as the immediate result of said wiring operation, comprising staplers for applying the binding wires, spacing blocks for insertion between the ends of the cleats, feeding means for advancing said blocks and materials relative to said staplers, extractor mechanism toward which the blocks are advanced by said feeding means, and means for operating said mechanism to forcibly disengage the blocks from the blanks, said devices including a ratchet feed for controlling the motion of the materials relatively to said staplers and a relatively fast operating friction feed for propelling the blocks toward the staplers.

29. A machine for making box blanks by successively wiring together the side material and cleats forming the previously unconnected side parts of each blank, to produce a flexible blank as the immediate result of said wiring operation, comprising staplers for applying the binding wires, spacing blocks for insertion between the ends of the cleats, feeding means for advancing said blocks and materials relative to said staplers, extractor mechanism toward which the blocks are advanced by said feeding means, and means for operating said mechanism to forcibly disengage the blocks from the blanks, said devices including a friction feed for engaging said blocks, and a ratchet feed for engaging the upper surface of the blanks.

30. A machine for making box blanks by successively wiring together the side material and cleats forming the previously unconnected parts of each blank, to produce a flexible blank as the immediate result of said wiring operation, comprising staplers for applying the binding wires, spacing blocks for insertion between the ends of the cleats, guides for said blocks and cleats, said guides and blocks being relatively formed to prevent upward displacement of the blocks from the guides, and feeding means for causing said blocks and cleats to move along said guides, said relative formation including coöperating ribs and grooves on the guides and blocks, and said machine comprising automatic extractors having surfaces complementary to the guiding surfaces of the blocks.

31. A box blank machine comprising discrete spacing blocks for insertion between the ends of the cleats of a box blank on a conveyer, means for wiring the sections of the blank together, and automatic means for positively removing the blocks from the blanks and from the conveyer.

32. A box blank machine comprising discrete spacing blocks for insertion between the ends of the cleats, means for wiring the sections of the blank together, automatic means for positively removing the blocks from the blanks, and means for causing the return of said blocks adjacent to their point of insertion and operating in cycle with the means for removing the blocks.

33. A box blank machine comprising a forwardly extending guideway and a rearwardly extending guide-way for spacing blocks, discrete spacing blocks, stapling devices for applying binding wires to the box materials, means for feeding forwardly box blank materials assembled with said blocks and means for transferring said blocks from one guideway to the other.

34. A box blank machine comprising a forwardly extending guideway and a rearwardly extending guideway for spacing blocks, discrete spacing blocks, stapling devices for applying binding wires to the box materials, means for feeding forwardly box blank materials assembled with said blocks, means for transferring said blocks from one guide-way to the other, and means for feeding the blocks along the rearwardly extending guideway.

35. A box blank machine comprising a set of discrete devices for spacing the ends of the cleats of a box blank assembled on a conveyer, means for wiring the sections of the blank together, and automatic means for positively removing the devices from their spacing position on the conveyer.

36. A box blank machine comprising a set of discrete devices for spacing the ends of the cleats, means for wiring the sections of the blank together, automatic means for positively removing the devices from their spacing position, and means for causing the return of said devices adjacent to their point of insertion and operating in cycle with the means for removing the devices.

Signed by me at St. Joseph, this 26 day of June, 1912.

JULIUS J. MILLER.

Witnesses:
 ED A. GAST,
 ALBERT C. TILLY.